United States Patent [19]

Nava

[11] Patent Number: 5,714,568

[45] Date of Patent: Feb. 3, 1998

[54] METHODS OF PREPARING POLYESTERS FROM CYCLE ORGANIC CARBONATES IN THE PRESENCE ALKALI METAL-CONTAINING CATALYSTS

[75] Inventor: Hildeberto Nava, Cary, N.C.

[73] Assignee: Reichhold Chemicals, Inc., Durham, N.C.

[21] Appl. No.: 718,950

[22] Filed: Sep. 26, 1996

[51] Int. Cl.$^6$ .................................................. C08G 64/00
[52] U.S. Cl. ........................ 528/196; 528/176; 528/190; 528/193; 528/194; 528/198
[58] Field of Search .............................. 528/176, 190, 528/193, 194, 196, 198

[56] References Cited

U.S. PATENT DOCUMENTS

| | | | |
|---|---|---|---|
| 3,549,692 | 12/1970 | Bockmann | 526/176 |
| 3,553,167 | 1/1971 | Schnell et al. | 528/176 |
| 4,107,143 | 8/1978 | Inata et al. | 528/176 |
| 4,216,298 | 8/1980 | Schreckenberg et al. | 525/439 |
| 4,217,297 | 8/1980 | Lindner et al. | 260/463 |
| 4,261,922 | 4/1981 | Kern | 562/77 |
| 4,297,455 | 10/1981 | Lindner et al. | 525/439 |
| 4,310,706 | 1/1982 | Strege | 568/648 |
| 4,310,707 | 1/1982 | Strege | 568/648 |
| 4,310,708 | 1/1982 | Strege et al. | 568/648 |
| 4,341,905 | 7/1982 | Strege | 568/45 |
| 4,355,136 | 10/1982 | Dombroski et al. | 525/35 |
| 4,388,455 | 6/1983 | Bales | 528/176 |
| 4,584,408 | 4/1986 | Wang et gal. | 568/48 |
| 4,613,678 | 9/1986 | Swart | 560/92 |
| 5,059,723 | 10/1991 | Dressler | 568/640 |
| 5,068,460 | 11/1991 | Sumner, Jr. et al. | 568/648 |
| 5,304,628 | 4/1994 | Kinoshita et al. | 528/370 |
| 5,442,037 | 8/1995 | Lee et al. | 528/301 |
| 5,451,656 | 9/1995 | Menovcik et al. | 528/288 |
| 5,616,681 | 4/1997 | Itoh et al. | 528/279 |

FOREIGN PATENT DOCUMENTS

WO91/16292  4/1991  WIPO ................. C07C 41/16

*Primary Examiner*—Terressa Mosley
*Attorney, Agent, or Firm*—Myers Bigel Sibley & Sajovec, LLP

[57] ABSTRACT

A process for preparing an esterification product is disclosed. The process comprises providing a polyfunctional organic acid or anhydride, a cyclic organic carbonate compound, and a catalyst selected from the group consisting of an alkali metal, an alcohol-derived salt of the alkali metal, and mixtures thereof, and reacting the polyfunctional organic acid or anhydride and the cyclic organic carbonate compound in the presence of the catalyst to form the esterification product.

16 Claims, No Drawings

METHODS OF PREPARING POLYESTERS FROM CYCLE ORGANIC CARBONATES IN THE PRESENCE ALKALI METAL-CONTAINING CATALYSTS

FIELD OF THE INVENTION

The present invention relates to a process for the preparation of an esterification product. More particularly, the invention relates to a process for the preparation of an esterification product by reacting a polybasic organic acid and a cyclic organic carbonate compound in the presence of a catalyst.

BACKGROUND OF THE INVENTION

Polyester-based resins, such as those formed from saturated and unsaturated polyesters, are utilized in a wide variety of end-use applications. The resins can be used, for example, in conjunction with other types of materials to form a composite. As an example, a prepreg is a composite consisting of fiber reinforcements placed within the resin, which is typically molded with pressure or vacuum to provide a variety of molded articles. Prepregs have applications in aerospace, transportation, appliances, sanitary ware, and the like.

Moreover, polyester resins can be diluted with organic solvents such as styrene to form laminating resins or gel coats. Typically, such resins are coated onto components which are used as panels forming the exterior bodies of vehicles, marine vessels, aircraft, and the like.

Traditional processes of forming saturated and unsaturated polyesters have involved the thermal dehydration of polyfunctional organic acids and alcohols, more particularly, dicarboxylic acids and diols. These processes, however, are disadvantageous in that long reaction times are involved, along with extreme processing conditions with respect to temperature and pressure. For example, such reactions occur at temperatures from 200° to 260° C. and pressures from 10 to 40 psi and can take from 20 to 40 hours. Other efforts have focused on producing polyesters by reacting a carboxylic acid or anhydride with an organic carbonate, such as ethylene or propylene carbonate, in the presence of a catalyst. For example, U.S. Pat. No. 3,549,692 to Böckmann et al. proposes the reaction between an anhydride of a carboxylic acid and a cyclic carbonate of an alkylene glycol in the presence of imidazole catalysts. U.S. Pat. No. 4,613,678 to Swart proposes the esterification of aromatic dicarboxylic acids with cyclic alkylene carbonates in the presence of pyridine and pyridine-substituted catalysts. The products formed in these reactions are used in the preparation of polyesters.

The above catalysts, however, suffer from drawbacks. Specifically, the catalysts cause the esterification products to exhibit a high degree of undesired coloration which is aesthetically unpleasing. The products also are capable of forming highly-colored complexes when mixed with carboxylic acid and anhydride monomer in the preparation of saturated and unsaturated polyesters.

In view of the above, it is an object of the present invention to provide a catalyst to be utilized in the reaction of a polyfunctional organic acid or anhydride and a cyclic organic carbonate to form an esterification product which minimizes the disadvantages associated with previous esterification reactions.

SUMMARY OF THE INVENTION

To these ends and others, the present invention provides a process for preparing an esterification product in a reduced time and under less severe processing conditions with respect to temperature and pressure. Specifically, the process comprises providing a polyfunctional organic acid or anhydride, a cyclic organic carbonate compound, and a catalyst selected from the group consisting of an alkali metal, an alcohol-derived salt of the alkali metal, and mixtures thereof; and reacting the polyfunctional organic acid or anhydride and the cyclic organic carbonate compound in the presence of the catalyst to form the esterification product. Preferably, the cyclic organic carbonate compound is selected from the group consisting of propylene carbonate, 1,2-butylene carbonate, 2,3-butylene carbonate, phenylethylene carbonate, and mixtures thereof.

In another embodiment, the present invention comprises the additional step of reacting the esterification product with a compound selected from the group consisting of a monofunctional organic acid or anhydride, and mixtures thereof to form a polyester resin. In another embodiment, an alcohol or a hydroxyalkyl derivative of a phenol is reacted with the esterification product and the compound selected from the group consisting of a monofunctional organic acid, a polyfunctional organic acid or anhydride, and mixtures thereof to form the polyester resin.

DETAILED DESCRIPTION OF THE PREFERRED EMBODIMENTS

As summarized above, the present invention relates to a process for providing an esterification product. Specifically, the process includes providing a polyfunctional organic acid or anhydride, a cyclic organic carbonate compound, and a catalyst selected from the group consisting of an alkali metal, an alcohol-derived salt of the alkali metal, and mixtures thereof; reacting the polyfunctional organic acid or anhydride and the cyclic organic carbonate compound in the presence of the catalyst to form the esterification product.

The polyfunctional organic acid or anhydride which may be employed are any of the numerous and known compounds. Suitable polyfunctional acids or anhydrides thereof include, but are not limited to, maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, alkenyl succinic acids such as n-dodecenylsuccinic acid, docecylcucinic acid, octadecenylsuccinic acid, and anhydrides thereof. Lower alkyl esters of any of the above may also be employed. Mixtures of any of the above are suitable.

Numerous cyclic organic carbonate compounds may be used in the invention, including those described in U.S. Pat. No. 2,987,555 to Davis, the disclosure of which is incorporated herein by reference in its entirety. In general, suitable organic carbonate compounds include any cyclic alkylene carbonate having the appropriate carbonate moiety attached at adjacent positions capable of undergoing hydroxyalkylation with the phenolic or thiophenolic compounds. Particularly suitable cyclic organic carbonates are of the general formula:

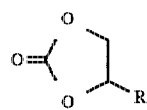

where R is selected from the group consisting of H, $C_1$–$C_{18}$ alkyl, $C_1$–$C_{20}$ alkoxy, alkoxyalkylene, (poly) alkoxyalkylene, and aryl. Specific examples of cyclic organic carbonates include, but are not limited to, propylene carbonate, 1,2- and 2,3-butylene carbonate, and phenylethylene carbonate. Mixtures of any of the above compounds may be employed. The cyclic organic carbonate may be employed in any suitable amount in the process.

The catalyst which is to be employed in the esterification reaction may be selected from an alkali metal, an alcohol-derived salt of the alkali metal, and mixtures thereof. For the purposes of the invention, the alkali metal is to be utilized in substantially pure form. For the purposes of the invention, the alkali metal catalyst in "substantially pure form" relates to a metal existing as an uncombined chemical element. The alcohol-derived salt which may be employed, includes for example, methoxide and ethoxide salts of the above metals. For the purposes of the invention, the preferred catalyst is sodium methoxide.

The metal or alcohol-derived salt catalyst may be used alone or in combination with other catalysts such as, but not limited to, triorgano phosphine compounds (e.g., triphenyl phosphine, tributyl phosphine, diphenylbutyl phosphine, and dibutyl phosphine); phosphonium salts (e.g., triphenyl phosphonium bromide, triphenyl phosphonium acetate, tributyl phosphonium bromide, tributyl phosphonium acetate); imidazoles (e.g., imidazole, 2-methylimidazole, N-(2'-hydroxyethyl)-2-methylimidazole, piperidine, morpholine, triethylamine); tertiary amine compounds and their salts (e.g., triethyl amine and tributyl amine); and organometallic salts (e.g., zinc octoate, magnesium octoate, zirconium hexanoate). The catalyst may be used in various amounts in the process. Typically as is known to one skilled in the art, this amount will vary depending on the type of polyfunctional organic acid or anhydride, cyclic organic carbonate, and catalyst used. Reaction conditions such as temperature and pressure also may influence catalyst amount. The amount of catalyst is preferably between about 0.005 and 3.0 percent by weight based on the total amount of reacting components. More preferably, the catalyst amount will be between about 0.01 to 1.0 percent by weight.

Additional components which are known to be used in esterification reactions may be utilized in the process. As an example, the reaction may take place in the presence of an appropriate inert solvent such as, for example, toluene, xylene, cyclohexane, tetrahydronaphthalene, naphthalene, anisole, and chlorobenzene. The use of a solvent will typically depend on its properties and on the types of polyfunctional organic acid or anhydride, cyclic organic carbonate, and catalyst used. Typically, the addition of a solvent is not necessary for carrying out the reaction.

The process may be carried out using various molar ratios of the cyclic organic carbonate compound to the polyfunctional organic acid or anhydride. Preferably, the cyclic organic carbonate may be added in an amount from about 1.00 to 1.50 moles per every mole of polyfunctional organic acid or anhydride, and more preferably from about 1.00 to 1.05 per every mole of polyfunctional organic acid or anhydride.

The process of the invention may be carried out in any known and suitable vessel which is designed to contain the reactants and products, including those described in U.S. Pat. No. 4,310,708 to Strege et al., the disclosure of which is incorporated herein by reference in its entirety. Preferably, the materials of the vessel are inert under the conditions employed during the process. Such materials may include glass, stainless steel, and the like.

The reaction may be run at any suitable temperature, preferably from about 100° C. to 200° C., and more preferably from about 150° C. to 190° C. It is believed that the reaction rate of the esterification reaction is temperature dependent. Accordingly, the optimum operating temperature for any reaction may be determined by the skilled artisan through experimentation. Heating of the reaction vessel to the operating temperature may be achieved by any suitable heating means such as a heat lamp, heating mantle, oil bath, and the like.

The reaction time to obtain adequate conversion of the polyfunctional organic acid or anhydride will typically vary depending on various factors such as, for example, temperature, catalyst type, and type of polyfunctional organic acid or anhydride and cyclic organic carbonate. Generally, the time which is sufficient for the reaction to take place is when an acid number of from 0.0 to 20.0 is achieved, usually from 2 to 15 hours.

Additional means may be employed to facilitate the reaction of the polyfunctional organic acid or anhydride and the cyclic organic carbonate. For example, the reaction may proceed with or without stirring by mechanical, magnetic or other known means.

The esterification product produced in accordance with the invention may be used as is or may be purified by any of the well known techniques including fractional distillation or crystallization.

In another embodiment, the process of the present invention includes the additional step of reacting the esterification product with a compound selected from the group consisting of a monofunctional organic acid, a polyfunctional organic acid or anhydride, and mixtures thereof to form a polyester resin. Additionally, an alcohol or a hydroxyalkyl derivative of a phenol may be reacted with the esterification product and the compound selected from the group consisting of a monofunctional organic acid, a polyfunctional organic acid or anhydride, and mixtures thereof to form the polyester resin. Any known and suitable polyester resins may be formed from the esterification product of the present invention. For example, branched and linear polyesters of varying molecular weights may be formed. The components (e.g., acids, anhydrides, alcohols, and hydroxyalkyl derivatives of phenols) which are suitable in forming these various polyesters are well known to the skilled artisan. Any of the known and appropriate processes can be employed in producing the polyester resin.

Any of the appropriate monofunctional organic acids may be used in forming the polyester resin. These compounds include, for example, acrylic acid, methacrylic acid, crotonic acid, cinnamic acid, sorbic acid, and benzoic acid. Mixtures of any of the above may be employed. Preferably, the monofunctional organic acid is employed in an amount ranging from about 20 to 60 percent based on the weight of the polyester resin.

Suitable polyfunctional organic acids or anhydrides include, but are not limited to, those disclosed herein. Preferably, the polyfunctional organic acid or anhydride is used in an amount ranging from about 30 to 60 percent based on the weight of the polyester resin.

Any alcohols which are appropriate in polyester-forming reactions may be utilized. Such compounds include, but are not limited to, ethylene glycol, propylene glycol, diethylene glycol, neopentyl glycol, dipropylene glycol, polytetramethylene glycol, 1,5-pentanediol, 1,4-butanediol, 1,6-hexanediol, 1,4-cyclohexanediol, 1,4-cyclohexanedimethanol, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl propanetriol, 2-methyl 1,2,4-butanetriol, trimethylol ethane, trimethylol propane, and 1,3,5-trihydroxyethyl benzene. Mixtures of any of the above may be used.

The hydroxyalkyl phenol derivatives may be produced utilizing any appropriate processes and starting materials. For example, the derivatives may be formed by the reaction between a phenol and an organic oxide such as ethylene oxide or propylene oxide, or from the reaction between a phenol and a cyclic organic carbonate such as described in U.S. Pat. Nos. 4,310,708 and 5,059,723 to Strenge et al. and Dressier, respectively; The disclosures of the above references are incorporated herein by reference in their entirety. Phenols which may be used in the polyester-forming reaction are well known and include all appropriate mono- and polyhydric phenols. Examples of monohydric phenols which may be hydroxylated generally include phenol, β-naphthol, p,p'-sec-butylidene, o-chloro phenol, o-cresol, p-propyl phenol, p-bis(o-cresol), phenyl phenol, nonyl phenol, mono-, di-, and tri-alkyl phenols, $C_1$ to $C_{18}$ substituted phenols, polyaralkylphenols, halophenols, arylphenols, naphthols and hydroxyquinoline. Examples of some useful polyhydric phenols which may be hydroxylated include catechol; resorcinol; hydroquinone; 4,4'-biphenol; 4,4'-isopropyllidenebis(o-cresol); 4,4'-isopropylidenebis(2-phenyl phenol); alkylidenediphenols such as bisphenol A, pyrogallol, and phloroglucinol. Mixtures of any of the above may be used. Exemplary phenol derivatives include hydroxyethyl and hydroxypropyl derivatives.

The alcohols and hydroxyalkyl derivatives of phenols may be used in any suitable amount, preferably from about 35 to 65 percent based on the weight of the polyester resin.

The formation of the polyester resin can be facilitated by employing a curing agent which includes any of the known peroxides and curing accelerators or promoters.

Suitable peroxides include, for example, cumene hydroperoxide, methyl ethyl ketone peroxide, benzoyl peroxide, acetyl acetone peroxide, 2,5-dimethylhexane-2,5-dihydroperoxide, tert-butyl peroxybenzoate, di-tert-butyl perphthalate, dicumylperoxide, 2,5-dimethyl-2,5-bis(tert-butylperoxy)hexane, 2,5-dimethyl-2,5-bis (tert-butylperoxy) hexyne 3, bis (tert-butylperoxyisopropyl) benzene di-tert-butyl peroxide, 1,1-di (tert-amylperoxy)-cyclohexane, 1,1-di-(tert-butylperoxy)-3,3,5-trymethylcyclohexane, 1,1-di-(tert-butylperoxy)-cyclohexane, 2,2-di-(tert-butylperoxy)-butane, n-butyl 4,4-di-(tert-butylperoxy)-valerate, ethyl 3,3-di-(tert-amylperoxy)-butyrate, ethyl 3,3-di-(tert-butylperoxy)-butyrate and the like. Mixtures of any of the above may be used. The peroxide is preferably employed in an amount from about 1 to 2.5 percent based on the weight of the polyester resin, more preferably from about 1 to 1.5 percent by weight, and most preferably from about 1 to 1.25 percent by weight.

Suitable curing accelerators or promoters include, for example, cobalt naphthanate, cobalt otoate, N,N-dimethyl aniline, N,N-dimethyl acetamide, and N,N-dimethyl para-toluidine. Mixtures of the above may be used. The curing accelerators or promoters are preferably employed in amounts from about 0.05 to 1.0 percent by weight, more preferably from about 0.1 to 0.5 percent by weight, and most preferably from about 0.1 to 0.3 percent by weight of the polyester resin.

The polyester resin can be incorporated with any number of other suitable components so as to be useful in a wide variety of applications. For example, the polyester can be combined with various vinyl ester resins, aliphatic conjugated dienes, non-aromatic unsaturated mono- or dicarboxylic ester monomers, and/or aromatic unsaturated monomers so as to form a solid product useful as a toner resin, a powder coating, or a binder. Moreover, the polyester resin may be employed as a curable thermosetting resin useful for forming molded or shaped articles which require desirable hardness, elongation, toughness, and corrosion resistance properties along with high heat resistance. The polyester resin may be used with any appropriate fibrous reinforcing material to form pre-pregs. Any of the known processes may be used to form the pre-pregs including, for example, pultrusion.

Moreover, the polyester resin can be combined with known and suitable monomeric components to form a liquid resin such as a laminating resin or a gel coat resin for coating on a suitable substrate. The substrate may be part of an article of manufacture such as, for example, a marine vessel, a vehicle, or an aircraft.

Vinyl monomers may be used in forming the liquid resin including those such as, for example, styrene and styrene derivatives such as alpha-methylstyrene, para methyl styrene, isopropyl styrene, divinyl benzene, divinyl toluene, ethyl styrene, vinyl toluene, tert-butyl styrene, monochlorostyrene, dichlorostyrene, vinyl benzyl chloride, fluorostyrene, and alkoxystyrenes (e.g., paramethoxystyrene). Other monomers which may be used include, for example, diallyl phthalate, hexyl acrylate, octyl acrylate, octyl methacrylate, diallyl itaconate, diallyl maleate, hydroxyethyl acrylate, hydroxyethyl methacrylate, hydroxypropyl acrylate, and hydroxypropyl methacrylate. The vinyl monomer which may be employed can be any appropriate polyfunctional acrylate, including those described, for example, in U.S. Pat. No. 4,916,023 to Kawabata et al., the disclosure of which is incorporated by reference herein in its entirety. Such compounds include hydroxypropyl methacrylate, hydroxyethyl methacrylate, and the like. The polyfunctional acrylate which may be used in the present invention can be represented by the general formula:

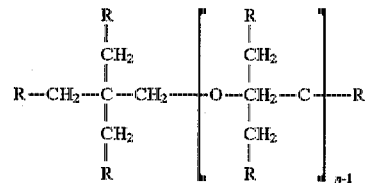

wherein at least four of the represented R's present are (meth) acryloxy groups, with the remainder of the R's being an organic group except (meth)acryloxy groups, and n is an integer from 1 to 5. Examples of polyfunctional acrylates include ethoxylated trimethyolpropane triacrylate, trimethyolpropane tri(meth)acrylate, trimethyolpropane triacrylate, trimethylolmethane tetra(meth)acrylate, pentaerythritol tetra (meth)acrylate, dipentaerythritol tetra(meth) acrylate, dipentaerythritol penta(meth)acrylate, and dipentaerythritol hexa (meth)acrylate. Mixtures of any of the above may be used in conjunction with the polyester resin. The vinyl monomers may be employed in any amount, preferably from about 3 to 10 percent based on the weight of the polyester resin.

The following examples are provided to illustrate the present invention, and should not be construed as limiting thereof.

EXAMPLES

In the examples set forth below, melt index was measured on a melt index apparatus provided from CEAST, Co. of Fort Mill, S.C.; glass transition temperature was measured on a DSC-7 from Perkin-Elmer of Pittsburgh, Pa.; rheology measurements were performed on a Carry-Med Rheometer CSL from TA Instruments of New Castle, Del. The above properties were determined under standard procedures. Resin tensile strength was measured in accordance with ASTM Standard D-638; flexural strength was measured in accordance with ASTM Standard D-79; barcol hardness was determined in accordance with ASTM Standard D-2583; elongation was measured in accordance with ASTM Standard D-638; and heat distortion was measured in accordance with ASTM Standard D-648. The phenol reactions were followed by the consumption of the phenolic compound by analytical titration methods as described in R. W. Martin, *Analytical Chemistry*, 21, 1419 (1949). The acid number of the resin refers to the number of milligrams of potassium hydroxide required to neutralize one gram of resin.

Examples A through E

Examples A through E represent various esterification products. The products were made in a reactor equipped with a suitable condenser and a heating mantle charge with a phenol, ethylene or propylene carbonate, and 0.1 percent of sodium methoxide (25 percent concentration in methanol) in the amounts listed in Table 1. The reaction was performed at 180° C. and the formation of the hydroxyl derivative was followed by titration of the unreacted phenol. The reaction was stopped until no more unreacted phenol was detected. The resulting melting point of the hydroxylated phenol was determined by DSC utilizing standard procedures. The hydroxylated phenol intermediates were made in sufficient amounts to be used in subsequent experiments.

Examples F through H

Ethylene or propylene carbonate were charged together with terephthalic acid in the amounts listed in Table 1. The materials were mixed with 0.1 percent sodium methoxide (25 percent concentration in methanol) and the reaction was performed at 190° C. to 200° C. until an acid number of less than 1 was obtained. Example H was reacted at 200° C. for six hours and subsequently at 250° C. for six additional hours. Properties of these materials are listed on Table 1.

Examples I through Q

Alkoxylated phenols described in Examples A through C were mixed in a reactor with dicarboxylic acids in the molar amounts described in Table 2. The mixtures also contained an esterification catalyst such as dibutyl tin oxide. The materials were reacted at temperatures between 200° C. and 220° C. to a low acid number. The results are presented in Table 2.

TABLE I

| | Examples* | | | | | | | |
|---|---|---|---|---|---|---|---|---|
| | A | B | C | D | E | F | G | H |
| Ethylene Carbonate | 1.10 | 1.10 | 1.10 | 2.10 | | 2.10 | | 1.10 |
| Propylene Carbonate | | | | | 2.10 | | 2.10 | |
| Nonyl Phenol | 1.00 | | | | | | | |
| Phenyl Phenol | | 1.00 | | | | | | |
| Phenol | | | 1.00 | | | | | |
| Bisphenol "A" | | | | 1.00 | 1.00 | 1.00 | 1.00 | 1.00 |
| Terephthalic Acid | | | | | | 0.40 | 0.60 | |
| Acid Number | | | | | | | | |
| Brookfield Visc, Poise (deg. °C.) | 6.5 (25° C.) | *** | 0.3 (25° C.) | | 40 (40° C.) | | | |
| Cone & Plate Visc., poise (deg. °C.) | | | | 0.5 (125° C.) | | <1.0 (175° C.) | 2.5 (100° C.) | 1.0 (230° C.) |

*Amounts in moles.
***Tm = 120° C.; Tc = 112° C.

TABLE II

| | Examples* | | | | | | | | |
|---|---|---|---|---|---|---|---|---|---|
| | I | J | K | L | M | N | O | P | Q |
| Example B | 1.50 | 3.60 | 2.19 | 2.19 | 2.19 | 1.05 | 1.47 | 2.00 | 2.00 |
| Example A | 0.50 | 0.40 | | | | 1.05 | 0.63 | | |
| Example C | | | | | | | | 1.00 | |
| Fumaric acid | | | | | | | | | 1.00 |
| Adipic Acid | 1.00 | 2.00 | | | | 1.00 | 1.00 | | |
| Azelaic Acid | | | | | 1.04 | | | | |
| Sebacic Acid | | | | 1.04 | | | | | |
| Suberic Acid | | | 1.04 | | | | | | |
| Acid Number | 9.40 | 10.10 | 10.20 | 6.90 | 4.80 | 4.60 | 9.20 | 3.30 | 9.00 |
| Melting Paint, °C. | 50, 120 | 36, 121 | 125.00 | 124.00 | 92.00 | 62, 113 | 64, 121 | 137.00 | 124.00 |
| Cryst. Temp., °C. | 74, 30 | 111, 55 | 102.00 | 93.00 | 32.00 | 55, 48 | 73, 43 | 90.00 | 70.00 |

*Amounts in moles.

Examples R through Z and AA through AC

Diol intermediates were mixed with dicarboxylic acids and/or anhydrides in a molar ratio as listed in Tables 4 and 5. The mixtures also contained an esterification catalyst and inhibitors such as hydroquinone or toluhydroquinone when combined with unsaturated anhydrides such as maleic anhydride. The reactions were performed at temperatures between 200° C. and 230° C. until a low acid number was obtained. The results are presented in Tables 3 and 4.

Example AD

Alkoxylated BPA from Example E was mixed with maleic anhydride in the molar amounts listed in Table 5, together with 100 ppm of hydroquinone. The materials were reacted at 210° C. until an acid number of 18 was obtained. The mixture was cooled down and then diluted with styrene to a 50 percent concentration. Properties of the resin are listed in Tables 5 and 6.

Examples AE through AF

Propylene carbonate was charged together with isophthalic acid in the amounts listed in Table 5. The materials were mixed with 0.1 percent sodium methoxide (25 percent concentration in methanol) and the reaction performed at 200° C. until an acid number of less than one was obtained. The mixture was cooled down to 190° C. and maleic anhydride together with 50 ppm of hydroquinone were added and the reaction continued at 210° C. until a desired acid number was obtained. Properties of these materials are listed in Table 5.

Examples AG through AH

Propylene carbonate, terephthalic acid, and maleic anhydride were reacted under conditions similar to those employed in Examples AE and AF. At the end of the reaction, the mixtures were diluted in styrene in the amounts listed in Table 5. Physical properties of these materials are listed in Table 6.

As shown, the resins listed in Table 6 all possess good properties with respect to hardness, strength, and elongation.

TABLE III

| | Examples* | | | | | |
|---|---|---|---|---|---|---|
| | R | S | T | U | V | W |
| Example B | 1.00 | 1.00 | 1.00 | 1.00 | 1.00 | 1.00 |
| Ethylene Glycol | 4.68 | 4.68 | | 4.70 | 2.82 | 3.76 |
| Propylene Glycol | | | | | 1.88 | 0.94 |
| 1,4-CHDM | | | 4.70 | | | |
| Terephthalic acid | 2.80 | 4.00 | 4.00 | 3.60 | 4.00 | 4.00 |
| Adipic Acid | 1.20 | | | 0.40 | | |
| Acid Number | 7.40 | 15.00 | | 12.00 | 23.00 | 14.00 |
| Visc**., Poise @ ( ) | 4.0 (125° C.) | 4.0 (200° C.) | 1.0 (230° C.) | 4.0 (175° C.) | 14 (150) | 6 (175) |

*Amounts in Moles
**ICI Cone & Plate viscosity - ( ) temperature measured in degree °C.

TABLE IV

| | Examples* | | | | | |
|---|---|---|---|---|---|---|
| | X | Y | Z | AA | AB | AC |
| Example D | | | | 2.77 | 2.00 | |
| Example E | 1.03 | 2.00 | 2.00 | | | 1.68 |
| Neopentyl Glycol | | | | | | 1.46 |
| Hydrogenated BPA | | | | | | 1.07 |
| Maleic Anhydride | 1.00 | 1.30 | 0.50 | | 0.70 | 4.00 |
| Cyclohexane Dimethanol | | | | 1.80 | | |
| Terephthalic Acid | | | 0.50 | 3.77 | 0.30 | |
| Isophthalic Acid | | | | 0.41 | | |
| Crotonic Acid | | | | | 2.00 | |
| Acid Number | 19.70 | 8.00 | 6.50 | 9.70 | 18.60 | 13.00 |
| Viscosity**, poise (deg. ° C.) | >100 (200° C.) | 44 (125° C.) | >100 (200° C.) | 38 (200° C.) | 2.0 (125° C.) | 32 (200) |

*Amounts in Moles.
**ICI Cone & Plate viscosity

TABLE V

| | Examples* | | | | |
|---|---|---|---|---|---|
| | AD | AE | AF | AG | AH |
| Example E | 6.00 | | | | |
| Propylene Carbonate | | 13.20 | 10.25 | 12.30 | 10.25 |
| Propylene Glycol | | | 7.00 | 1.80 | 7.00 |
| Isophthalic Acid | | 6.00 | 5.00 | | |
| Terephthalic Acid | | | | 6.00 | 5.00 |
| Maleic Anhydride | 7.00 | 6.00 | 10.00 | 6.00 | 10.00 |
| Acid Number | 9.00 | 8.40 | 13.50 | 13.00 | 16.70 |
| Brookfield Vis., poise @ 25 C. | 4.50 | | | 21.40 | 5.50 |
| Solids Content, % | 50.00 | | | 65.50 | 54.90 |
| Cone & Plate Visc., poise (deg C.) | | 34(150) | 29(175) | | |

*Amounts in Moles.

TABLE VI

| Property | Physical Properties | | |
|---|---|---|---|
| | AG | AH | AD |
| Barcol Hardness | 57–60 | 57–59 | 59–63 |
| HDT, C. | 108 | 120 | 120 |
| Flex. Strength, Psi. | 18,600 | 16,500 | 17,200 |
| Flex. Mod. Psi. E6 | 5.10 | 5.40 | 4.90 |
| Ten. Strength, Psi | 10,000 | 8,700 | 10,000 |
| Ten. Mod. Psi. E6 | 5.00 | 5.20 | 4.80 |
| % Elongation | 2.40 | 2.00 | 2.52 |

The invention has been described in detail with reference to its preferred embodiments and its example. However, it will be apparent that numerous variations and modifications can be made without departure from the spirit and scope of the invention as described in the foregoing detailed specification and claims.

That which is claimed:

1. A process for the preparation of an esterification product comprising:
   providing a polyfunctional organic acid or anhydride, a cyclic organic carbonate compound, and a catalyst selected from the group consisting of an alkali metal, an alcohol-derived salt of the alkali metal, and mixtures thereof; and
   reacting the polyfunctional organic acid or anhydride and the cyclic organic carbonate compound in the presence of the catalyst to form the esterification product.

2. The process according to claim 1 wherein the alcohol-derived salt of the alkali metal is a methoxide or ethoxide salt.

3. The process according to claim 1 wherein the polyfunctional organic acid or anhydride is selected from the group consisting of maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, alkenyl succinic acids such as n-dodecenylsuccinic acid, docecylcucinic acid and octadecenylsuccinic acid, anhydrides thereof, and mixtures thereof.

4. The process according to claim 1 wherein the cyclic organic carbonate compound is selected from the group consisting of propylene carbonate, 1,2-butylene carbonate, 2,3-butylene carbonate, phenylethylene carbonate, and mixtures thereof.

5. A process for the preparation of a polyester resin comprising:
   providing a polyfunctional organic acid or anhydride, a cyclic organic carbonate compound, and a catalyst selected from the group consisting of an alkali metal, an alcohol-derived salt of the alkali metal, and mixtures thereof;
   reacting the polyfunctional organic acid or anhydride and the cyclic organic carbonate compound in the presence of the catalyst to form an esterification product; and
   reacting the esterification product with a compound selected from the group consisting of a monofunctional organic acid or anhydride, a polyfunctional organic acid or anhydride, and mixtures thereof to form the polyester resin.

6. The process according to claim 5 wherein the monofunctional organic acid or anhydride is selected from the group consisting of acrylic acid, methacrylic acid, crotonic acid, cinnamic acid, sorbic acid, benzoic acid, anhydrides thereof, and mixtures thereof.

7. The process according to claim 5 wherein an alcohol or a hydroxyalkyl derivative of a phenol is reacted with the esterification product and the compound selected from the group consisting of a monofunctional organic acid or anhydride, a polyfunctional organic acid or anhydride, and mixtures thereof to form the polyester resin.

8. The process according to claim 5, further comprising the step of combining the polyester resin with a monomeric component to form a liquid resin.

9. A process for the preparation of an esterification product comprising:
   providing a polyfunctional organic acid or anhydride, a cyclic organic carbonate compound, and from about 0.0005 to 3.0 percent by weight of a catalyst selected from the group consisting of an alkali metal, an alcohol-derived salt of an alkali metal, and mixtures thereof, wherein the cyclic organic carbonate compound is present in an amount from about 1.00 to 1.50 moles per every mole of the polyfunctional organic acid or anhydride; and
   reacting the polyfunctional organic acid or anhydride and the cyclic organic carbonate compound in the presence of the catalyst to form the esterification product.

10. The process according to claim 9 wherein the alcohol-derived salt of the alkali metal is a methoxide or ethoxide salt.

11. The process according to claim 9 wherein the polyfunctional organic acid or anhydride is selected from the group consisting of maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, alkenyl succinic acids such as n-dodecenylsuccinic acid, docecylcucinic acid and octadecenylsuccinic acid, anhydrides thereof, and mixtures thereof.

12. The process according to claim 9 wherein the cyclic organic carbonate compound is selected from the group consisting of propylene carbonate, 1,2-butylene carbonate, 2,3-butylene carbonate, phenylethylene carbonate, and mixtures thereof.

13. A process for the preparation of a polyester resin comprising:
   providing a polyfunctional organic acid or anhydride, a cyclic organic carbonate compound, and a catalyst selected from the group consisting of an alkali metal, an alcohol-derived salt of the alkali metal, and mixtures thereof;
   reacting the polyfunctional organic acid or anhydride and the cyclic organic carbonate compound in the presence of the catalyst to form an esterification product; and
   reacting the esterification product with a compound selected from the group consisting of a monofunctional organic acid or anhydride, a polyfunctional organic acid or anhydride, and mixtures thereof to form the polyester resin.

14. The process according to claim 13 wherein the monofunctional organic acid or anhydride is selected from the group consisting of acrylic acid, methacrylic acid, crotonic acid, cinnamic acid, sorbic acid, benzoic acid, anhydrides thereof, and mixtures thereof.

15. The process according to claim 13 wherein an alcohol or a hydroxyalkyl derivative of a phenol is reacted with the esterification product and the compound selected from the group consisting of a monofunctional organic acid or anhydride, a polyfunctional organic acid or anhydride, and mixtures thereof to form the polyester resin.

16. The process according to claim 13, further comprising the step of combining the polyester resin with a monomeric component to form a liquid resin.

* * * * *